United States Patent [19]

Rebordosa

[11] Patent Number: 5,639,034
[45] Date of Patent: Jun. 17, 1997

[54] WORKING CHAMBER FOR AN ELECTRONICALLY OPERATED DOMESTIC KITCHEN APPLIANCE

[75] Inventor: Antonio Rebordosa, Manresa, Spain

[73] Assignee: Braun Aktiengesellschaft, Kronberg, Germany

[21] Appl. No.: 537,828

[22] PCT Filed: Jun. 21, 1994

[86] PCT No.: PCT/EP94/02018

§ 371 Date: Oct. 24, 1995

§ 102(e) Date: Oct. 24, 1995

[87] PCT Pub. No.: WO95/01746

PCT Pub. Date: Jan. 19, 1995

[30] Foreign Application Priority Data

Jul. 5, 1993 [DE] Germany .................. 43 22 280.3

[51] Int. Cl.⁶ .................. B02C 18/06; B02C 18/08
[52] U.S. Cl. .................. 241/199.12; 241/282.1
[58] Field of Search .................. 241/199.12, 282.1, 241/285.1

[56] References Cited

U.S. PATENT DOCUMENTS

| 2,585,255 | 2/1952 | Kochner et al. | 241/282.1 |
| 2,585,925 | 2/1952 | Gallenkamp | 241/282.1 |
| 3,493,022 | 2/1970 | Mantelet. | |
| 4,752,041 | 6/1988 | Franke et al. | 241/282.1 |
| 5,205,500 | 4/1993 | Eide | 241/154 |
| 5,323,973 | 6/1994 | Ferrara, Jr. | 241/37.5 |

FOREIGN PATENT DOCUMENTS

| 245188 | 2/1966 | Austria. |
| 28 50 724 | 6/1980 | Germany. |
| 2307545 | 12/1990 | Japan. |
| 281 508 | 1/1971 | U.S.S.R. . |

*Primary Examiner*—John M. Husar
*Attorney, Agent, or Firm*—Fish & Richardson, P.C.

[57] ABSTRACT

A working bowl for an electrically powered domestic kitchen appliance, within which, a working tool is able to rotate. The working bowl includes a wall having the form of a substantially regular polygon with at least five and preferably fifteen sides. The axis of rotation of the tool lies at the center of the circumcircle of the respective polygon. As a result, food items such as parsley, onions, etc. are fed back to the working tool particularly effectively, thereby enabling the food to be comminuted especially rapidly.

4 Claims, 1 Drawing Sheet

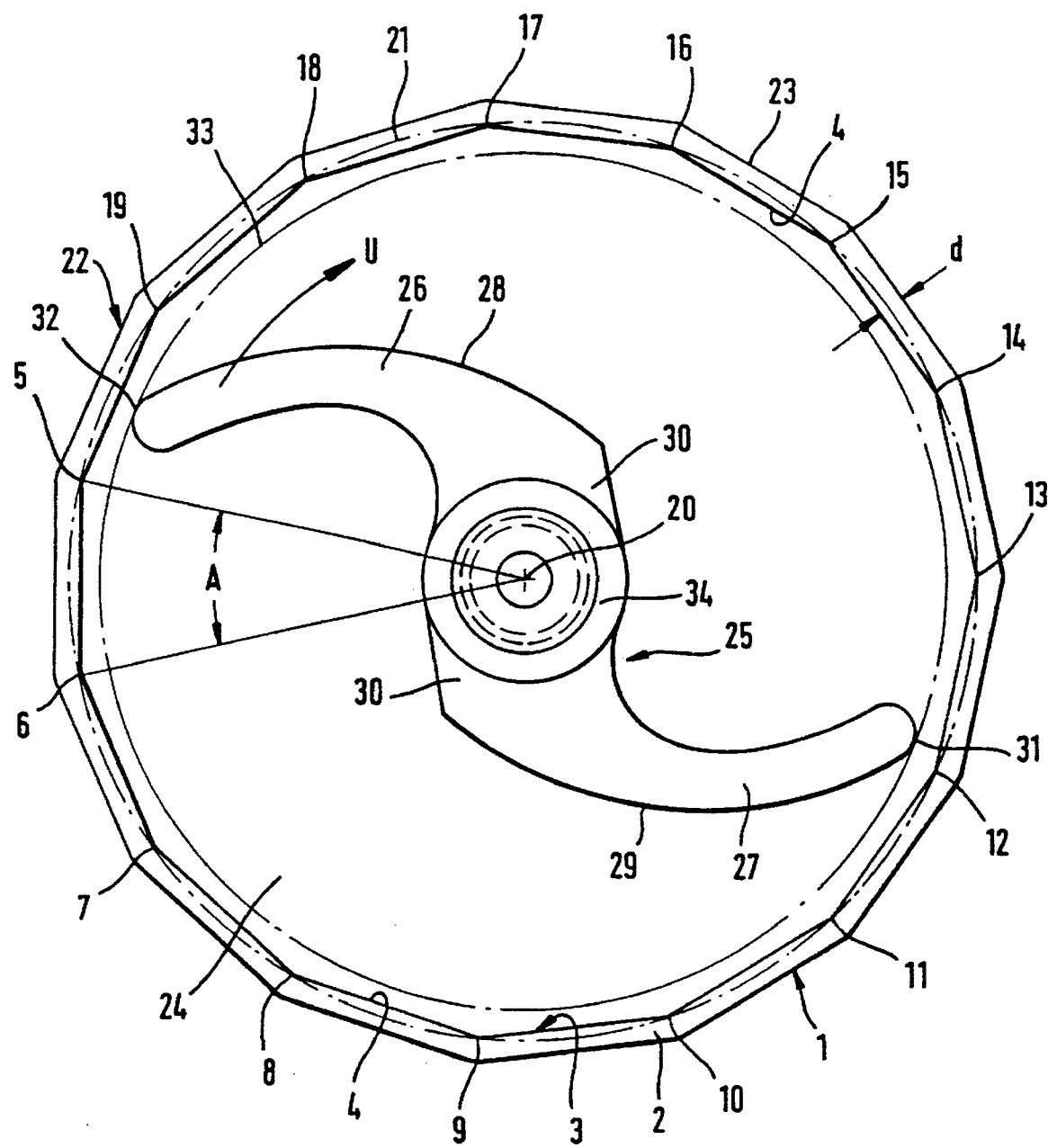

WORKING CHAMBER FOR AN ELECTRONICALLY OPERATED DOMESTIC KITCHEN APPLIANCE

FIELD OF THE INVENTION

The invention relates to a working bowl for an electrically powered domestic kitchen appliance.

BACKGROUND OF THE INVENTION

Working bowls for electrically powered domestic kitchen appliances include among other tools, a relatively fast-spinning, blade-like working tool is to be able to rotate, with at least one end of the blade-like tool being invariably guided in close proximity to the inner wall of the working bowl as the tool rotates.

A working bowl of this type for an electrically powered domestic kitchen appliance is known in the art from DE-28 50 724 C2. This working bowl has on its inner wall ribs extending into the bowl interior and serving the function of improving and speeding up the food comminuting process in the use of the kitchen appliance. In operation, the food items are comminuted by the rotating blade and flung against the ribs where they are slowed down and flung back to the blade to be further comminuted by that blade. However, the rib structure renders manufacture and cleaning of the working bowl considerably more difficult.

It is therefore an object of the present invention to improve upon a working bowl of the type initially referred to such as to enable the food items contained therein to be comminuted or processed by a rotating working tool in a minimum of time, and to afford ease of manufacture of the working bowl in addition to enabling it to be readily cleaned by hand following use.

SUMMARY OF THE INVENTION

According to the present invention, the cross-section of the inner wall of the working bowl takes the form of a substantially regular polygon having at least five sides, and that the axis of rotation of the blade-like tool lies at the center of the circumcircle of the respective polygon. Because the inner wall of the working bowl is formed by a substantially regular polygon, that is, all of its sides are of approximately equal length, the food materials are comminuted in the working bowl particularly rapidly, especially when a rotary cutter blade is utilized. After the food impinges against the inner wall, the polygonal profile causes the food to be deflected from the inner wall and directed back to the bite of the blade for further comminution. Considering that this process is repeated several times within a minimum of time, uniform comminution of the food is accomplished after an only brief period of operation of the domestic kitchen appliance. It is noted that a bowl configured in this fashion is of equal advantage as in the kneading of dough, the dough inside being worked thoroughly by the rotating dough hook, while the dough outside is worked by the polygonal structure of the inner wall. The invention may also contemplate the provision of a polygon having sides of different lengths.

The working bowl of the present invention affords particular ease of manufacture and cleaning by reason of the absence of sharp corners and projections that would necessitate intricate injection molds for the manufacture of the working bowl. By virtue of the polygonal configuration of the bowl wall, the food items are initially directed into the individual corners and, pushed on by the straight connecting surfaces, are rapidly fed back to the working tool, thus enabling a substantially more intensive processing of the food items to be accomplished without the need for an intricately shaped working bowl.

To provide a working bowl whose wall is of nearly uniform thickness over its entire circumference, a further feature of the present invention provides for the outer wall to extend at a small relative distance and parallel to the inner wall. With a working bowl configured in this manner, the cost of the material is maintained particularly low.

However, it can also be considered that the cross-section of the outer wall is formed by a circle whose center lies at the center of the circumcircle and whose diameter is slightly greater than the diameter of the circumcircle. In a working bowl of this type, the wall thickness of the working bowl varies continuously, the wall being at its thinnest in the corners. The circular outer surface of the wall of the working bowl affords particularly good handling because of the large smooth surface it provides.

Particularly advantageously, the polygon is comprised of fifteen sides, that is, when a line is drawn from the corners of one side to the center of the working bowl, these two lines enclose an angle of 24°, approximately. Accordingly, if this angle is 24° for one side, irrespective of the diameter of the working bowl, a bowl having fifteen sides is obtained, which ensures optimum mixing and cutting results at all times.

One embodiment of the present invention will be described in more detail in the following with reference to the accompanying drawing.

BRIEF DESCRIPTION OF THE DRAWING

In the sole FIGURE of the drawing, a working bowl is shown in top plan view view.

DESCRIPTION OF THE PREFERRED EMBODIMENT

A working bowl 1 includes including an annular wall structure 2 whose inner wall 3 is formed by a regular polygon which in the embodiment shown comprises fifteen sides 4, each side 4 being of a length such that lines drawn from its corners 5, 6 to the center 20 of the polygon 3 or the working bowl 1 enclose an angle A of 24°. Using a polygon with fifteen sides having corners 5 to 19, a total angle of 360° results, so that the first side is again joined by the fifteenth side. The polygon 3 is circumscribed by a circumcircle 21 (shown in dot-and-dash lines) intersecting the corners 5 to 19. The circumcircle 21 merely serves as an auxiliary for the polygon 3.

In the FIGURE, the polygon 3 is surrounded by a further polygon 22 extending parallel to the polygon 3 at a relative distance d and forming the outer wall 22 of the working bowl 1. The outer wall 22 is equally formed by fifteen outer sides 23 extending parallel to the sides 4.

The working bowl 1 includes a bottom 24 in the proximity of which a working tool configured as a cutter 25 is adapted to rotate about the center 20 of and inside the working bowl 1. The cutter 25 is comprised of two essentially diametrically opposite blades 26, 27 having crescent-shaped cutting edges 28, 29 extending counterclockwise in the direction of rotation U. The two blades 26, 27 are connected with one another by a center piece 20 in which a hub 34 manufactured from a plastic material is secured. The hub 34 includes an engaging device, not shown in the FIGURE, which is adapted to be coupled to a drive shaft (not shown) of a kitchen appliance as known, for example, from the kitchen appliances manufactured by the applicant (see in this connection the Braun Programmübersicht (Braun Product Overview) of February 1993, page 35, plates 3 and 4, page 38, page 40, as well as page 41, second plate, top left).

As becomes apparent from the sole FIGURE, with the blades rotating, the free ends 31, 32 of the respective blades 27, 26 describe an imaginary circle of rotation 33 extending at a small and constant distance relative to the inner wall 3 of the working bowl.

When the working bowl 1 holds food materials such as parsley, onions, etc., these are picked up by the blades 26, 27 of the cutter 25 and comminuted. As this occurs, the centrifugal forces acting on the food cause a large portion of the food materials to be flung against the inner wall 3 of the working bowl 1 and to be moved on in the circumferential direction U, whereby the food is then urged against one of the sides 4 in the circumferential direction. According to the present invention, the food is then no longer directed in the circumferential direction, but rather, it is deflected towards the bite of the cutter 25. Being thus fed back to the cutter, the food material is again picked up by the blades 26, 27, comminuted, and again flung against the wall of the bowl. This comminuting process is repeated several times within a short time, thus providing a particularly effective and speedy comminution of the food material. In cases where the working tool utilized is a dough hook, it is also possible to knead and work doughs particularly thoroughly.

I claim:

1. A working bowl for an electrically powered domestic kitchen appliance, the working bowl having a longitudinal axis and comprising a working tool which rotates about the longitudinal axis and within the working bowl, a bottom member lying in a horizontal plane transverse to the longitudinal axis, a wall having one end attached to the bottom member and having a cross-section which takes the form of a substantially regular polygon having at least five sides each side parallel to the longitudinal axis, the working tool having at least one end guided in close proximity to an inner surface of the wall and having an axis of rotation lying at the center of a circumcircle of the polygon.

2. A working bowl as claimed in claim 1, wherein an outer surface of the wall extends a small relative distance beyond and parallel to the inner surface of the wall.

3. A working bowl as claimed in claim 1, wherein the outer surface is formed by a circle whose center lies at the center of the circumcircle and whose diameter is slightly greater than the diameter of the circumcircle.

4. A working bowl as claimed in claim 1 wherein the wall has fifteen sides.

* * * * *

UNITED STATES PATENT AND TRADEMARK OFFICE
CERTIFICATE OF CORRECTION

PATENT NO.   : 5,639,034

DATED        : June 17, 1997

INVENTOR(S)  : Antonio Rebordosa

It is certified that error appears in the above-identified patent and that said Letters Patent is hereby corrected as shown below:

On the title page, Item

[54] "ELECTRONICALLY" should be --ELECTRICALLY--.

Col. 1, l. 2, "Electronically" should be --Electrically--.

Col. 2, l. 34, delete "In"; "the" should be --The--.

Col. 2, l. 35, delete "view", second occurrence.

Col. 2, l. 39, delete "including".

Signed and Sealed this

Twenty-second Day of June, 1999

Attest:

Q. TODD DICKINSON

*Attesting Officer*     Acting Commissioner of Patents and Trademarks